United States Patent [19]

Parsons

[11] Patent Number: 5,203,163
[45] Date of Patent: Apr. 20, 1993

[54] HEAT EXCHANGE ARRANGEMENT IN A GAS TURBINE ENGINE FAN DUCT FOR COOLING HOT BLEED AIR

[75] Inventor: Franklin D. Parsons, Cincinnati, Ohio

[73] Assignee: General Electric Company, Cincinnati, Ohio

[21] Appl. No.: 865,731

[22] Filed: Apr. 9, 1992

Related U.S. Application Data

[63] Continuation of Ser. No. 561,139, Aug. 1, 1990, abandoned.

[51] Int. Cl.⁵ .............................................. F02C 6/18
[52] U.S. Cl. .................................... 60/226.1; 60/266; 60/39.07
[58] Field of Search ............... 60/39.07, 39.83, 226.1, 60/262, 266

[56] References Cited

U.S. PATENT DOCUMENTS

| | | | |
|---|---|---|---|
| 3,475,906 | 11/1969 | Madelung | 60/39.07 |
| 3,777,489 | 12/1973 | Johnson et al. | 60/226 R |
| 3,826,084 | 7/1974 | Branstrom et al. | 60/39.07 |
| 4,187,675 | 2/1980 | Wakeman | 60/266 |
| 4,254,618 | 3/1981 | Elovic | 60/226 R |
| 4,404,793 | 9/1983 | Coffinberry | 60/39.07 |
| 4,531,357 | 7/1985 | Weber et al. | 60/39.07 |
| 4,542,623 | 9/1985 | Houan et al. | 60/226.1 |
| 4,546,605 | 11/0985 | Mortimer et al. | 60/226.1 |
| 4,574,584 | 3/1986 | Hovan | 60/39.02 |
| 4,607,657 | 8/1986 | Hirschkron | 137/15.1 |
| 4,779,644 | 10/1988 | Benson | 137/606 |
| 4,782,658 | 11/1988 | Perry | 60/226.1 |
| 4,791,782 | 12/1988 | Seed | 60/39.83 |
| 4,914,904 | 4/1990 | Parnes et al. | 60/226.1 |

FOREIGN PATENT DOCUMENTS

| | | | |
|---|---|---|---|
| 1019866 | 11/1957 | Fed. Rep. of Germany | |
| 1244340 | 8/1971 | United Kingdom | |
| 2085082 | 4/1982 | United Kingdom | 60/39.83 |
| 2152147 | 7/1985 | United Kingdom | 60/39.83 |

Primary Examiner—Richard A. Bertsch
Assistant Examiner—Michael I. Kocharov
Attorney, Agent, or Firm—Jerome C. Squillaro

[57] ABSTRACT

A heat exchange arrangement in an annular fan duct of a gas turbine engine includes a conduit routing hot bleed air flow, a heat exchanger disposed within the fan duct and connected with the conduit such that hot air is passed through the interior of the heat exchanger, and at least one and preferably a pair of partition members disposed within the fan duct for temporarily diverting a small portion of the main air flow from the fan duct and over the exterior of the heat exchanger in heat transfer relationship with the hot air passing through the interior of the heat exchanger. The small air flow portion rejoins the main air flow through the fan duct and is used to generate engine thrust after cooling the hot bleed air flow carried by the conduit. The partition members disposed adjacent to opposite sides of the heat exchanger and a support member define therewith an air diffusion passage through which the small fan duct air flow portion is diverted temporarily from the main fan duct air flow. The passage has an inlet and an outlet communicating with the main air flow and is larger in cross-sectional size at the location of the heat exchanger than at the inlet and outlet.

14 Claims, 5 Drawing Sheets

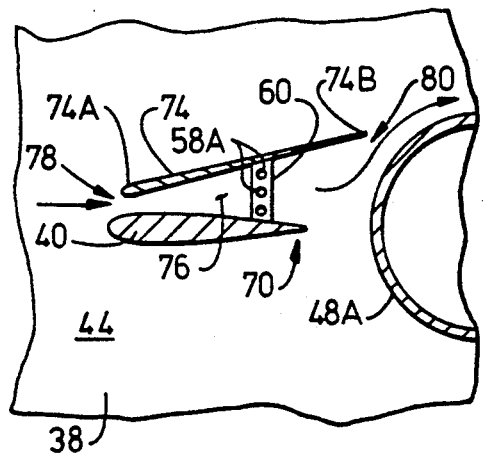
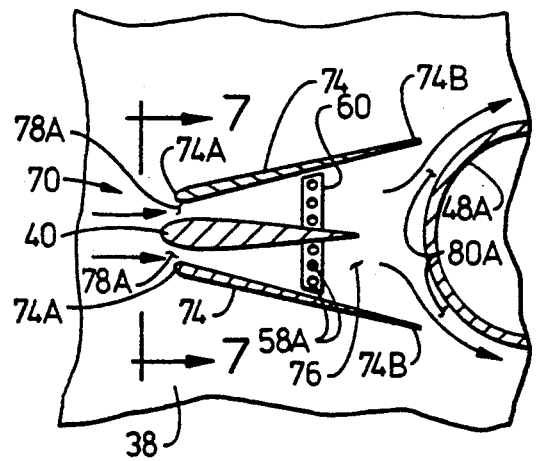
FIG. 5    FIG. 6
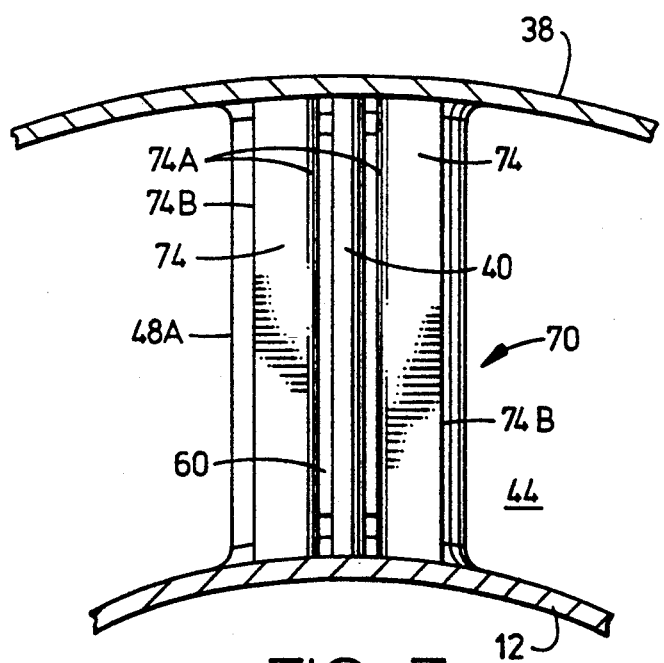
FIG. 7

HEAT EXCHANGE ARRANGEMENT IN A GAS TURBINE ENGINE FAN DUCT FOR COOLING HOT BLEED AIR

This application is a continuation of application Ser. No. 07/561,139, filed Aug. 1, 1990, now abandoned.

CROSS-REFERENCE TO RELATED APPLICATION

Reference is hereby made to the following copending U.S. patent application dealing with related subject matter and assigned to the assignee of the present invention: "Precooling Heat Exchange Arrangement Integral With Structure Fairing Of Gas Turbine Engine" by Franklin E. Miller, assigned U.S. Ser. No. 559,781 and filed Jul. 30, 1990.

BACKGROUND OF THE INVENTION

1. Field of the Invention

The present invention relates generally to gas turbine engines and, more particularly, to a heat exchange arrangement in a fan duct of a gas turbine engine for cooling high pressure hot bleed air.

2. Description of the Prior Art

Many commercial aircraft gas turbine engines employ high pressure hot air bled from the core engine compressor for use by different systems on the aircraft. In particular, the high pressure air is required by a variety of tasks on the aircraft, such as anti-icing and passenger cabin cooling. However, prior to use of the air, the temperature of the air must be lowered to reasonable levels in accordance with the requirements of each specific task.

One current method of cooling the high pressure compressor bleed air is to extract or bleed air from the engine fan duct aft of the outlet guide vanes of the engine nacelle. The cooler bleed air from the fan duct and the high pressure hotter bleed air from the core engine compressor are then passed through a heat exchanger where the hotter high pressure air gives up some of its thermal energy to the cooler fan duct bleed air.

Use of the heat exchange process is necessary, although, current systems for attaining heat transfers are unduly complex. In one system, an elaborate layout of piping is employed to pass the high pressure bleed air to the aircraft and to route the cooler fan duct bleed air to the location of the heat exchanger. By the time the cooler fan duct bleed air reaches the heat exchanger and performs its cooling task, it has lost most of its pressure (thrust potential) due to frictional losses because of various bends and turns of the piping. After exiting from the heat exchanger, the fan duct bleed air is discharged overboard from the aircraft structure with a negligible thrust benefit. The impact of the fan duct bleed air thrust loss on engine specific fuel consumption is significant. Furthermore, the excessively complex bleed air piping adds significantly to the aircraft weight.

Consequently, a need still remains for improvements in the arrangement for performing heat transfer operations which will avoid the fan duct bleed air loss experienced by the prior art.

SUMMARY OF THE INVENTION

The present invention provides a heat exchange arrangement designed to satisfy the aforementioned needs. The heat exchange arrangement of the present invention is provided within the engine fan duct for cooling high pressure hot air, such as bled from an engine core compressor, by temporarily diverting a small fractional portion of the fan duct air flow through the heat exchange arrangement in heat transfer relationship with the flow of hot bleed air. As a result, fan duct bleed air pressure losses are mitigated since the fan duct bleed air is only routed through a short streamlined passage within the fan duct that is partitioned from the main fan duct air flow. The fan duct bleed air is injected back into the fan duct after passing through the heat exchanger. The cooling air thus rejoins the main fan duct air flow and can be used to generate engine thrust. The cooling air pressure loss is reduced since no piping is required to carry the diverted fan duct air to the heat exchanger.

Accordingly, the present invention is provided in an annular fan duct of a gas turbine engine defined between an annular nacelle and a casing and having at least one support member extending radially between and interconnecting the nacelle and casing. The fan duct provides a main air flow for producing thrust. The present invention is directed to a heat exchange arrangement which comprises: (a) means in the form of a conduit connected in flow communication with a bleed air flow at a temperature higher than that of the fan duct air flow, the conduit having a section extending to and from the fan duct; (b) a heat exchanger disposed within the fan duct and interposed in the conduit section such that the conduit passes the bleed air flow through the interior of the heat exchanger; and (c) means disposed within the fan duct for temporarily diverting a small fractional portion of the fan duct main air flow from the fan duct and passing it over the exterior of the heat exchanger in heat transfer relationship with the bleed air flow passing through the interior of the heat exchanger such that the fan duct air flow fractional portion rejoins the main air flow through the fan duct and is used to produce engine thrust after cooling the bleed air flow carried by the conduit.

More particularly, in one embodiment the diverting means is a single partition member, whereas in another embodiment the diverting means is a pair of partition members. The partition members are in the form of elongated aerodynamic fairings spaced from and disposed adjacent to the heat exchanger and the support member and defining therewith an air diffusion passage through which the fractional portion of the fan duct main air flow is diverted for passing over the exterior of the heat exchanger. The passage has an inlet and an outlet communicating with the main air flow. The passage inlet is spaced from an upstream side of the heat exchanger, whereas the passage outlet is spaced from a downstream side thereof.

Also, the diffusion passage is larger in cross-sectional size at the location of the heat exchanger than at the inlet and outlet of the passage. Therefore, the diverted fractional portion of the fan duct main air flow decreases in velocity after entering the passage through the inlet and before reaching the heat exchanger and then increases in velocity after leaving the heat exchanger and approaching the outlet.

Further, in one embodiment, the support member includes a forward portion of a structural component for supporting the engine from an aircraft wing. The heat exchanger extends between the partition member and the forward portion of the structural component. The support member also includes a deflector member mounted to the forward portion of the structural component for bounding one side of the passage.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is a first alternative embodiment of the heat exchange arrangement.

FIG. 6 is a second alternative embodiment of the heat exchange arrangement.

FIG. 7 is an enlarged fragmentary transverse sectional view of the heat exchange arrangement as seen along line 7—7 of FIG. 6.

DETAILED DESCRIPTION OF THE INVENTION

Figure 1:
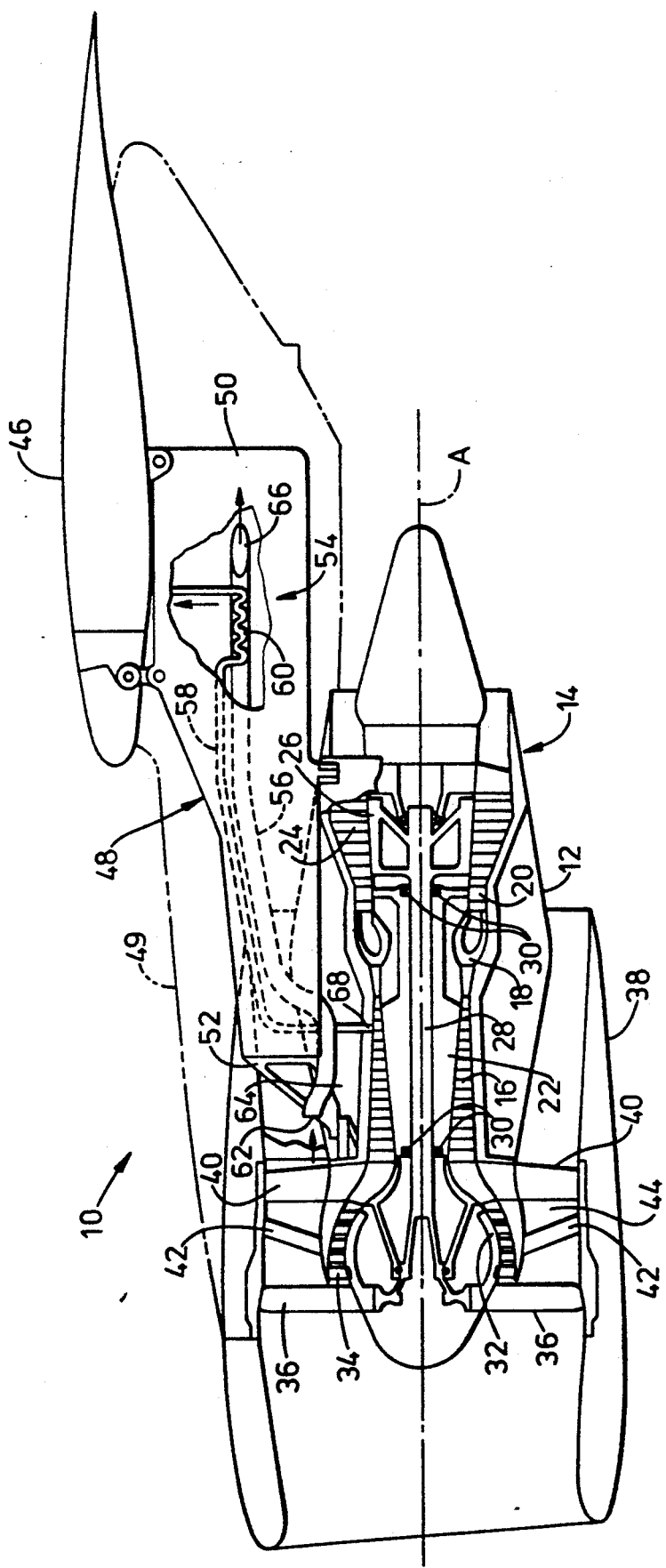
FIG. 1 is a schematic axial sectional view of a prior art gas turbine engine incorporating a prior art heat exchanger arrangement for cooling hot, high pressure air bled from the engine for use in different tasks on the aircraft.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a prior art gas turbine engine, generally designated 10, of an aircraft (not shown). The gas turbine engine 10 has a longitudinal center line or axis A and an annular casing 12 disposed coaxially and concentrically about the axis A. The engine 10 includes a core gas generator engine 14 which is composed of a compressor 16, a combustor 18, and a high pressure turbine 20, either single or multiple stage, all arranged coaxially about the longitudinal axis or center line A of the engine 10 in a serial, axial flow relationship. The high pressure turbine 20 is drivingly connected to the compressor 16 by an outer annular shaft 22.

The core engine 14 is effective for generating combustion gases. Pressurized air from the compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure power turbine 24.

The low pressure turbine 24 includes a rotor 26 which is fixedly attached to an inner drive shaft 28 and rotatably mounted within the outer drive shaft 22 via differential bearings 30. The inner drive shaft 28, in turn, mounts and rotatably drives a forward booster rotor 32 which forms part of a booster compressor 34. The compressor 34 supports a forward row of fan blades 36.

The engine 10 includes an annular nacelle 38 that houses the fan blades 36 and is disposed about the stationary casing 12. The nacelle 38 is supported by a plurality of fan frame struts 40 and outlet guide vanes 42 which interconnect the nacelle 38 and engine casing 12, extending radially across an annular fan duct 44 defined therebetween. Further, the engine 10 is supported from the underside of one of the wings 46 of the aircraft by an engine thrust-bearing structure 48 of a fairing 49 composed of an upper pylon 50 and upper bifurcation 52.

Prior Art Heat Exchange Arrangement

As also seen schematically in FIG. 1, the prior art engine 10 incorporates a prior art heat exchange arrangement, generally designated 54. The heat exchange arrangement 54 is provided for cooling high pressure hot air bled from the engine 10 for use in different tasks on the aircraft. The prior art heat exchange arrangement 54 includes piping 56, conduit 58 and heat exchanger 60 supported by the thrust-bearing structure 48 in the form of the upper pylon 50 and bifurcation 52.

The piping 56 of the prior art arrangement 54 has an inlet end 62 in the form of a scoop supported by an exhaust centerbody 64 of the casing 12 and projecting into the fan duct 44 and an outlet end 66 located in the region of the upper thrust-bearing structure 49 above and aft of the engine 10. The piping 56 at its inlet end 62 communicates with the fan duct 44 for bleeding a small proportion of the cooling air flow through the fan duct 44 and passing it over the exterior of the heat exchanger 60 before it reaches the outlet end 66 of the piping 56 where it is discharged overboard.

The conduit 58 of the prior art arrangement 54 has an inlet end 68 disposed in communication with the core engine compressor 16 for bleeding off a small proportion of high pressure hot air flow and passing it through the interior of the heat exchanger 60 where it is cooled before it is routed to the aircraft. The length of piping 56 needed to carry the fan duct cooling bleed air varies; however, a conservative estimate might be six feet of five inch diameter pipe.

Due to the layout of the piping 56, the cooling air bled from the fan duct 44 has to flow around many bends and turns in the piping 56 before reaching the heat exchanger 60 and piping outlet 66. As a result of the frictional losses incurred by traveling along such flow path, the cooling bleed air is discharged overboard after it has performed its cooling task in view that by then it has lost most of its thrust potential.

Heat Exchange Arrangement of the Present Invention

Figure 2:
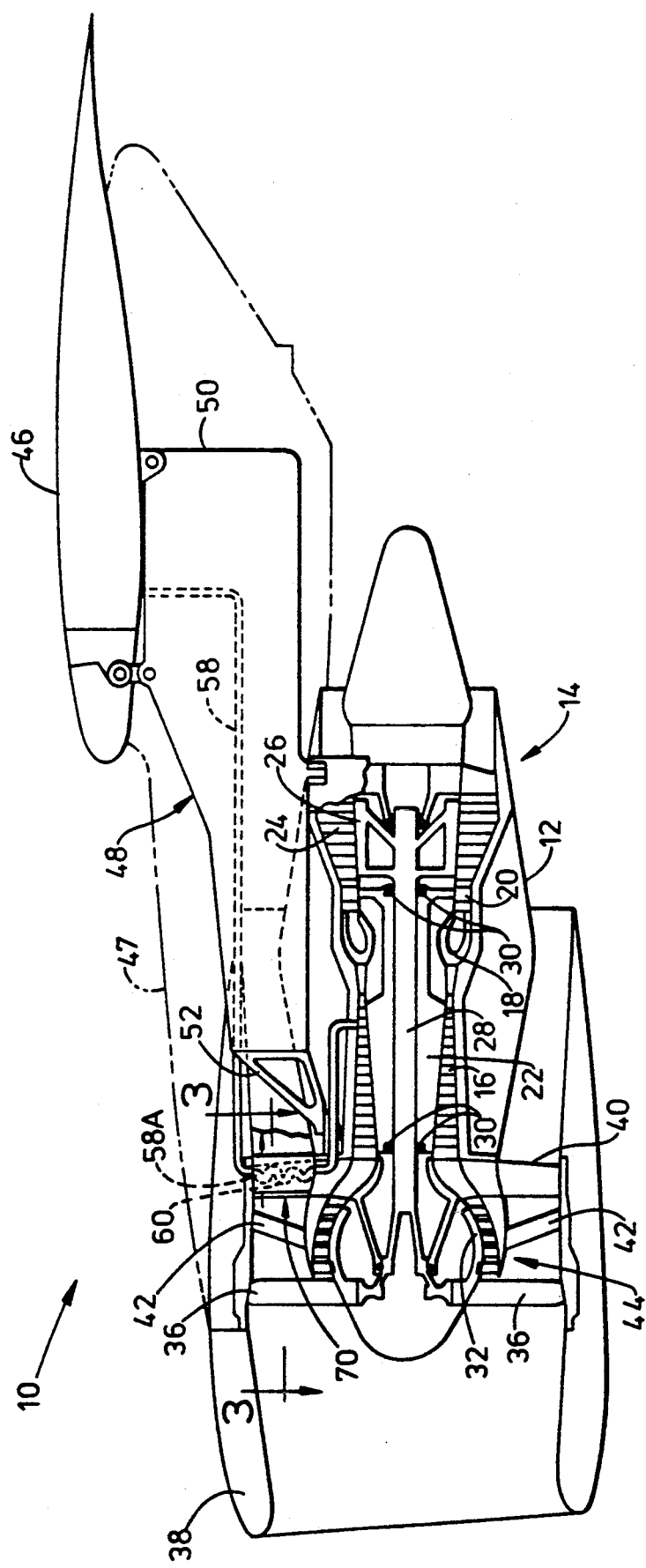
FIG. 2 is a schematic axial sectional view similar to FIG. 1 but illustrating a heat exchange arrangement of the present invention incorporated by the gas turbine engine.

Turning now to FIG. 2, there is illustrated a heat exchange arrangement of the present invention, generally designated 70. The heat exchange arrangement 70 employs the conduit 58 and the heat exchanger 60. The heat exchanger 60 is located in the fan duct 44 downstream of the outlet guide vanes 42 and upstream of the upper bifurcation 52 of the thrust-bearing structure 48 and extends radially between the nacelle 38 and engine casing 12. Now, a section 58A of the conduit 58 is rerouted to the fan duct 44, and the heat exchanger 60 is interposed in communication with the conduit section 58A within the fan duct 44 such that the conduit 58 passes the high pressure hot air, such as bled from an engine core compressor 16, through the interior of the heat exchanger 60 at the new location. The heat exchange arrangement 70 further includes means (see FIGS. 3 and 4) 72 for separating the heat exchanger 60 from the main air flow through the fan duct 44 and for temporarily diverting a small fractional proportion, such as approximately 1%, of the fan duct air flow from the fan duct 44 and passing it over the exterior of the heat exchanger 60.

The cooling air pressure loss experienced heretofore is now reduced, if not eliminated, in view that no structure comparable to the piping 56 is now required to carry the diverted fan duct air to the heat exchanger 60. As a result, fan duct air losses due to friction are avoided since the cooling air from the engine thrust-producing fan duct 44 is diverted from the fan duct and then back to it after passing only a short distance over the exterior of the heat exchanger 60 in heat transfer relationship with the flow of hot bleed air through the interior thereof. The cooling air thus rejoins the main air flow through the fan duct 44 and is used to generate engine thrust.

Figure 3:
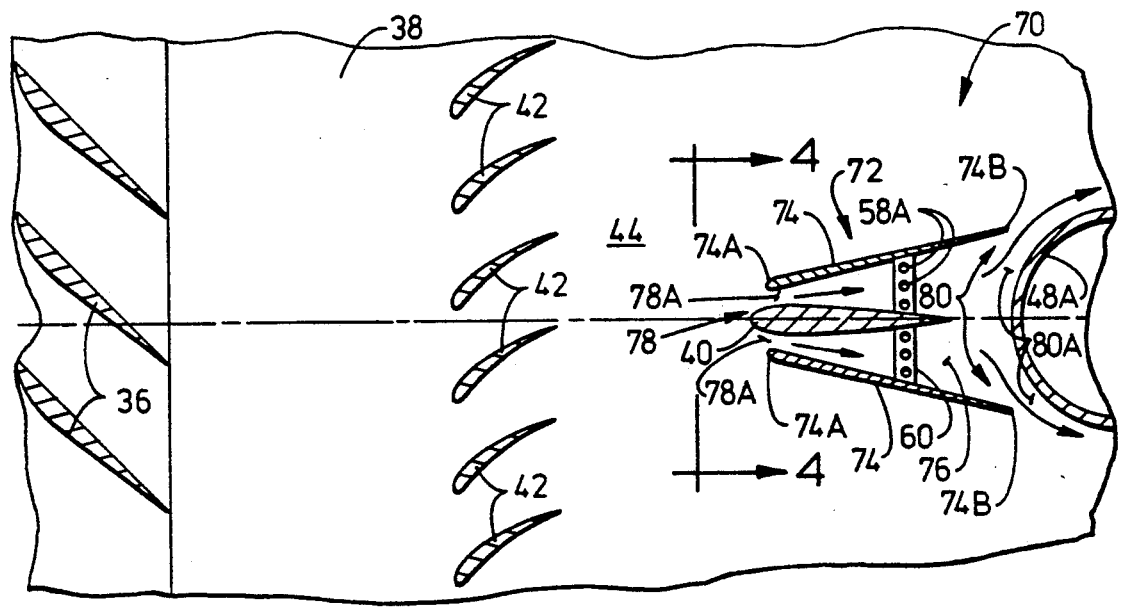
FIG. 3 is an enlarged fragmentary longitudinal sectional view of the heat exchange arrangement of the present invention as seen along line 3—3 of FIG. 2.
Figure 4:
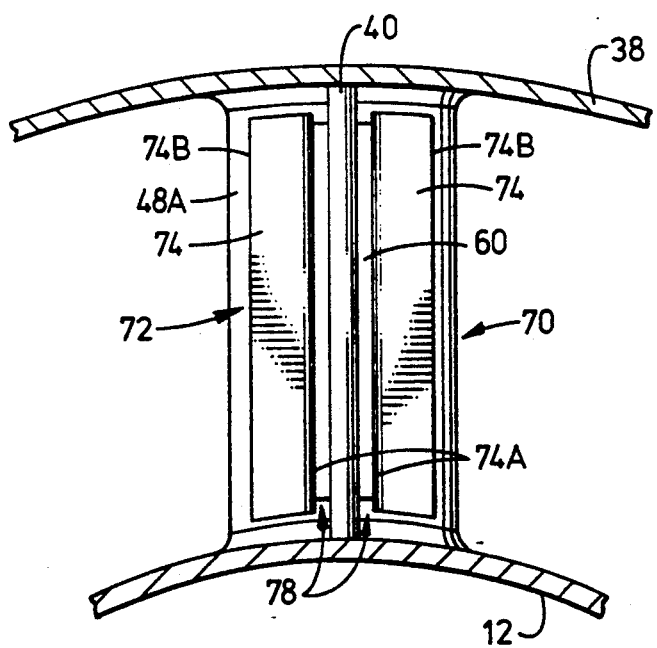
FIG. 4 is an enlarged fragmentary transverse sectional view of the heat exchange arrangement as seen along line 4—4 of FIG. 3.

Referring to FIGS. 3 and 4, the separating and air flow diverting means 72 includes a pair of partition members 74 in the form of elongated aerodynamic fairings disposed adjacent the opposite lateral sides of the heat exchanger 60 and the opposite sides of one of the fan support members, such as the fan frame strut 40. In the embodiment of FIGS. 3 and 4, the partition members 74 at locations approximately intermediate of their opposite ends are mounted to and supported by the opposite lateral sides of the heat exchanger 60. The partition members 74 extend radially between the nacelle 38 and engine casing 12 and are oriented transversely to the heat exchanger 60 and disposed adjacent to the heat exchanger 60 and fan frame strut 40.

The partition members 74 together with the fan frame strut 40 and heat exchanger define a radially and axially extending air flow diffusion passage 76 through which the small fractional portion of fan duct main air flow is diverted for passing over the exterior of the heat exchanger 60. The passage 76 has an inlet 78 and an outlet 80 communicating with the fan duct main air flow. The passage inlet 78 is divided into two laterally spaced portions 78A being defined between the front tips 74A of the partition members 74 and the opposite sides of the fan frame strut 40. The inlet 78 is spaced from an upstream, or front, side of the heat exchanger 60. The passage outlet 80 is likewise divided into two laterally spaced portions 80A being defined between the rear tips 74B of the partition members 74 and a front portion 48A of the thrust-bearing structure 48. The outlet 80 is spaced from a downstream, or rear, side of the heat exchanger 60.

The air flow diffusion passage 76 is larger in cross-sectional volume at the location of the heat exchanger 60 than at the locations of the inlet 78 and outlet 80 of the passage 76. Therefore, the diverted fractional portion of the fan duct main air flow decreases in velocity after entering the passage 76 through the inlet 78 and before reaching the heat exchanger 60 and then increases in velocity after leaving the heat exchanger 60 and approaching the outlet 80. This oppositely tapering configuration of the diffusion passage 76 reduces frictional losses in the diverted portion of the fan duct air flow within the passage 76 and permits the diverted air flow to reenter the main air flow so as to contribute to the thrust of the engine.

Several alternative embodiments of the heat transfer arrangement 70 are possible within the purview of the present invention. Referring first to FIG. 5, there is illustrated a first alternative embodiment of the heat exchange arrangement wherein only a single partition member 74 is employed instead of the pair thereof in the preferred embodiment of FIGS. 3 and 4. Consequently, there is only a single opening to both the inlet 78 and output 80 of the diffusion passage 76 which now runs only along on one side of the fan frame strut 40. Thus, the arrangement 70 of FIG. 5 is substantially the same as one-half of the arrangement shown in FIGS. 3 and 4. In a second alternative embodiment of the arrangement 70 shown in FIGS. 6 and 7, the only difference is that the partition members 74 are mounted at their upper and lower opposite ends to the nacelle 38 and casing 12.

Figure 8:
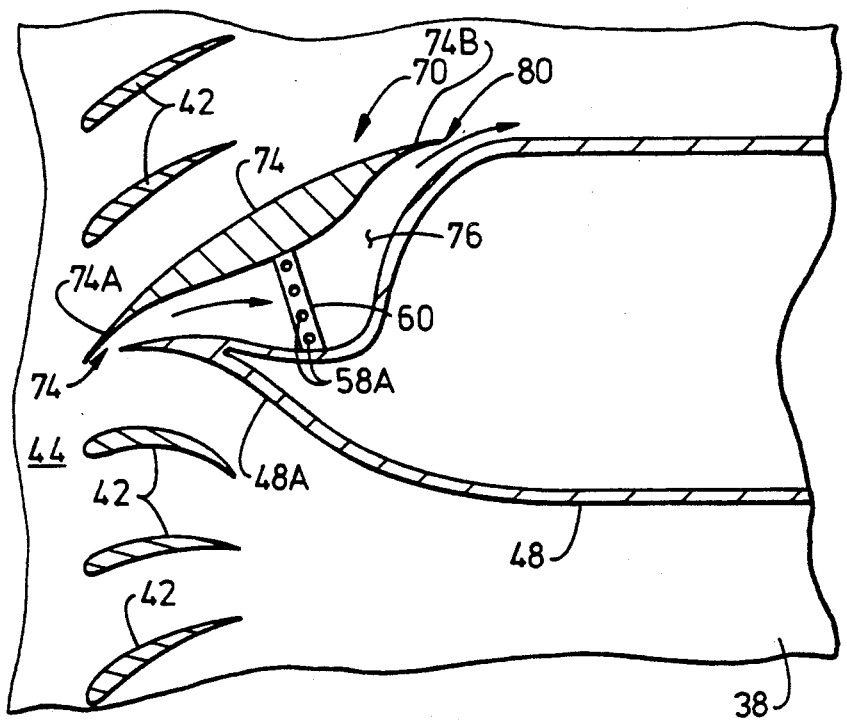
FIG. 8 is a third alternative embodiment of the heat exchange arrangement.
Figure 9:
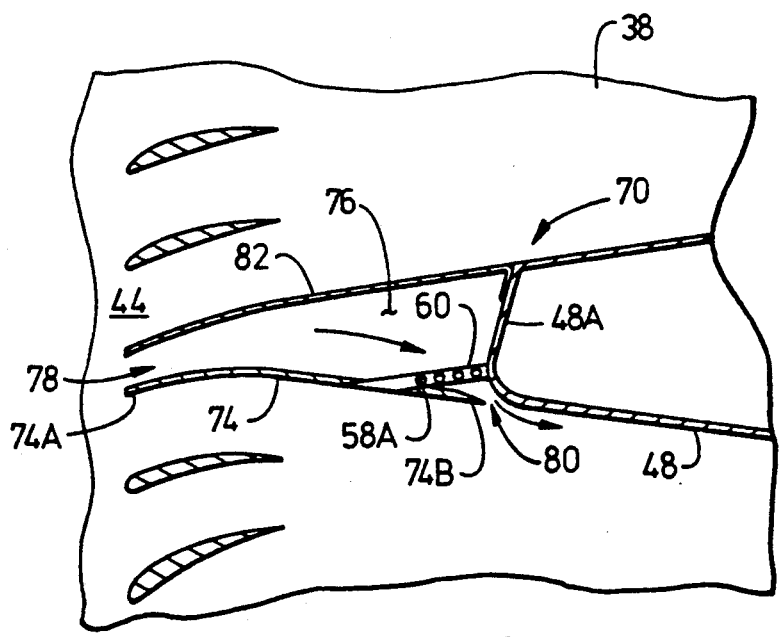
FIG. 9 is a fourth alternative embodiment of the heat exchange arrangement.

In several other alternative embodiments of the heat transfer arrangement 70, there is no fan frame strut present. Instead, in the third alternative embodiment illustrated in FIG. 8, the forward portion 48A of the thrust-bearing structure 48 has a configuration which replaces the fan frame structure in defining the air flow diffusion 76 having the desired reversely tapering longitudinal configuration. The front portion 48A and the partition 74 both have aerodynamic configurations similar to the configurations of the outlet guide vanes 42. Further, the heat exchanger 60 extends across the passage 76 between the single partition member 74 and the forward portion 48A of the structure 48. In the fourth alternative embodiment illustrated in FIG. 9, the forward portion 48A of the thrust-bearing structure 48 has a blunt configuration which is combined with an elongated deflector member 82 for bounding one side of the passage 76. The heat exchanger 60 extends between the partition member 74 and the forward portion 48A of the structure 48 and generally parallel to the deflector member 82. The blunt end of the structure forward portion 48A and the deflector member 82 provide a foreign object deflector and the orientation of the heat exchanger 60 prevents direct impact on it by foreign objects.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. In an annular fan duct of a gas turbine engine defined by an annular nacelle and a casing and at least one support member extending radially between and interconnecting said nacelle and casing, said fan duct providing a main air flow for producing thrust, a heat exchange arrangement comprising:

(a) a conduit connected in flow communication with a bleed flow at a temperature higher than that of the fan duct air flow, said conduit having a section extending to and from said fan duct;

(b) a heat exchanger disposed within said fan duct and extending between said nacelle and casing, said heat exchanger being interposed in said conduit section such that said conduit passes the bleed air flow to the interior of said heat exchanger; and (c) means disposed within said fan duct for separating said heat exchanger from the main air flow through said fan duct and for temporarily diverting a small fractional portion of the fan duct main air flow from said main air flow to pass said fractional air flow portion over the exterior of said heat exchanger in heat transfer relationship with the bleed air flow passing through the interior of said heat exchanger and thereafter to return said fractional air flow portion to the main air flow through said fan duct where it is used to produce engine thrust after cooling the bleed air flow carried by said conduit;

(d) said separating and diverting means including at least one partition member extending radially between said nacelle and casing, said partition member being oriented transversely to said heat exchanger and disposed adjacent to said heat exchanger and said support member so as to define therewith a radially and axially extending air diffusion passage through which said fractional air flow portion is diverted to pass over the exterior of said heat exchanger, said diffusion passage having an inlet and an outlet communicating with said main air flow, said inlet being spaced from one side of said heat exchanger and said outlet being spaced from an opposite side thereof, said diffusion passage being larger in cross-sectional size at the location of said heat exchanger than at said inlet and outlet of said passage and being provided with reversely tapering longitudinal configurations at said inlet and outlet of said passage such that said fractional air flow portion decreases in velocity after entering said passage through said inlet and before reaching said heat exchanger and then increases in velocity after leaving said heat exchanger and approaching said outlet.

2. The arrangement as recited in claim 1, wherein said partition member is an aerodynamic fairing.

3. The arrangement as recited in claim 1, wherein said partition member is mounted to said heat exchanger.

4. The arrangement as recited in claim 1, further comprising a pair of said partition members being located on opposite sides of said heat exchanger and said support member.

5. The arrangement as recited in claim 1, wherein said support member includes a forward portion of a structural component for supporting said engine from an aircraft wing.

6. The arrangement as recited in claim 5, wherein said heat exchanger extends between and is mounted to said partition member and said forward portion of said structural component.

7. The arrangement as recited in claim 5, wherein said support member also includes a deflector member mounted to said forward portion of said structural component and bounding one side of said passage.

8. In a gas turbine engine including a core engine providing a source of high pressure hot air, an annular nacelle, and at least one support member extending radially between said connecting with said nacelle and core engine and spacing said nacelle about and outwardly from said core engine so as to define an annular fan duct therebetween providing a path of cool main air flow for producing thrust, said support member extending across said cool air flow path, a heat exchange arrangement comprising:

(a) means for routing a source of high pressure hot bleed air to and from said fan duct;

(b) a heat exchanger disposed within said fan duct and extending radially between said nacelle and casing, said heat exchanger being connected in flow communication with said routing means such that the high pressure hot bleed air passes through the interior of said heat exchanger; and (c) at least one elongated partition member disposed within said fan duct for separating said heat exchanger from the main air flow through said fan duct and for temporarily diverting a small fractional portion of the fan duct main air flow from said main air flow to pass said fractional air flow portion over the exterior of said heat exchanger in heat transfer relationship with the high pressure hot air passing through the interior of said heat exchanger and thereafter to return said fractional air flow portion to the main air flow through said fan duct where it is used to generate engine thrust after cooling the high pressure hot air carried by said routing means;

(d) said partition member extending radially between said nacelle and casing, said partition member being oriented transversely to said heat exchanger and disposed adjacent to said heat exchanger and said support member so as to define therewith a radially and axially extending air diffusion passage through which said fractional air flow portion is diverted to pass over the exterior of said heat exchanger, said passage having an inlet and an outlet communicating with said main air flow, said diffusion passage being larger in cross-sectional size at the location of said heat exchanger than at said inlet and outlet of said passage and being provided with reversely tapering longitudinal configurations at said inlet and outlet of said passage such that said fractional air flow portion decreases in velocity after entering said passage through said inlet and before reaching said heat exchanger and then increases in velocity after leaving said heat exchanger and approaching said outlet.

9. The arrangement as recited in claim 8, wherein said partition member is an aerodynamic fairing.

10. The arrangement as recited in claim 8, wherein said partition member is mounted to said heat exchanger.

11. The arrangement as recited in claim 8, further comprising a pair of said partition members being located on opposite sides of said heat exchanger and said support member.

12. The arrangement as recited in claim 8, wherein said support member includes a forward portion of a structural component for supporting said engine from an aircraft wing.

13. The arrangement as recited in claim 12, wherein said heat exchanger extends between and is mounted to said partition member and said forward portion of said structural component.

14. The arrangement as recited in claim 12, wherein said support member also includes a deflector member mounted to said forward portion of said structural component and bounding one side of said passage.

* * * * *